(12) United States Patent
Kliber et al.

(10) Patent No.: US 12,292,105 B2
(45) Date of Patent: May 6, 2025

(54) STRAIN WAVE GEAR SYSTEM

(71) Applicant: Nexen Group, Inc., Vadnais Heights, MN (US)

(72) Inventors: Anthony Will Kliber, Andover, MN (US); Charles Christian Boushek, Saint Francis, MN (US)

(73) Assignee: Nexen Group, Inc., Vadnais Heights, MN (US)

( * ) Notice: Subject to any disclaimer, the term of this patent is extended or adjusted under 35 U.S.C. 154(b) by 0 days.

(21) Appl. No.: 18/511,738

(22) Filed: Nov. 16, 2023

(65) Prior Publication Data

US 2024/0084879 A1 Mar. 14, 2024

Related U.S. Application Data

(62) Division of application No. 17/526,215, filed on Nov. 15, 2021, now Pat. No. 11,852,229, which is a
(Continued)

(51) Int. Cl.
| | |
|---|---|
| F16H 49/00 | (2006.01) |
| F16C 33/66 | (2006.01) |
| F16D 3/02 | (2006.01) |
| F16H 57/021 | (2012.01) |
| F16H 57/029 | (2012.01) |

(Continued)

(52) U.S. Cl.
CPC ....... *F16H 49/001* (2013.01); *F16C 33/6603* (2013.01); *F16C 33/6622* (2013.01); *F16D 3/02* (2013.01); *F16H 57/021* (2013.01); *F16H 57/029* (2013.01); *F16H 57/0421* (2013.01); *F16H 57/045* (2013.01); *F16H 57/0464* (2013.01); *F16H 57/0471* (2013.01); *F16C 2361/61* (2013.01); *F16D 3/72* (2013.01); *F16H 2049/003* (2013.01); *F16H 2057/0225* (2013.01)

(58) Field of Classification Search
CPC .. F16J 15/06; F16J 15/062; F16J 15/16; F16J 15/40; F16H 49/001; F16H 57/021; F16H 57/0421; F16H 57/0471; F16H 57/0464; F16H 57/045; F16H 57/029; F16H 2049/003; F16H 2057/0225; F16D 3/02; F16D 3/72; F16C 33/6622; F16C 33/6603; F16C 2361/61
See application file for complete search history.

(56) References Cited

U.S. PATENT DOCUMENTS

2007/0024011 A1* 2/2007 Michaud ............... H01S 3/03
277/628

* cited by examiner

*Primary Examiner* — Victor L MacArthur
(74) *Attorney, Agent, or Firm* — Best & Flanagan LLP

(57) ABSTRACT

A strain wave gear system (10) includes first and second sets of ball bearings (80, 82) located intermediate a flange (84) and a retainer plate (88) rotatable with an output (54) and a radially oriented flat disc (74) of the input including strain relief (76). Strain relief (76) is a helical slot in a coupling (70) located radially within the wave generator (94) and the ring gear (22). The ring gear (22) is sealed by a sealing system including sealant (42) forced by a protrusion (34) of the cap (24) entering into a cavity (36) through a channel (40) into a relief volume (38) of the housing (12). The bearing (48) rotatably mounting the housing (12) to the output (54) is lubricated by a lubricating system including plungers (110) threadably received in axial bores (102) intersecting with radial bores (104) in communication with radial holes (47) of the bearing (48).

3 Claims, 5 Drawing Sheets

Related U.S. Application Data division of application No. 16/132,559, filed on Sep. 17, 2018, now Pat. No. 11,174,929, which is a division of application No. 14/422,882, filed as application No. PCT/US2013/055985 on Aug. 21, 2013, now Pat. No. 10,077,829.

(60) Provisional application No. 61/691,400, filed on Aug. 21, 2012.

(51) Int. Cl.
*F16H 57/04* (2010.01)
*F16D 3/72* (2006.01)
*F16H 57/022* (2012.01)

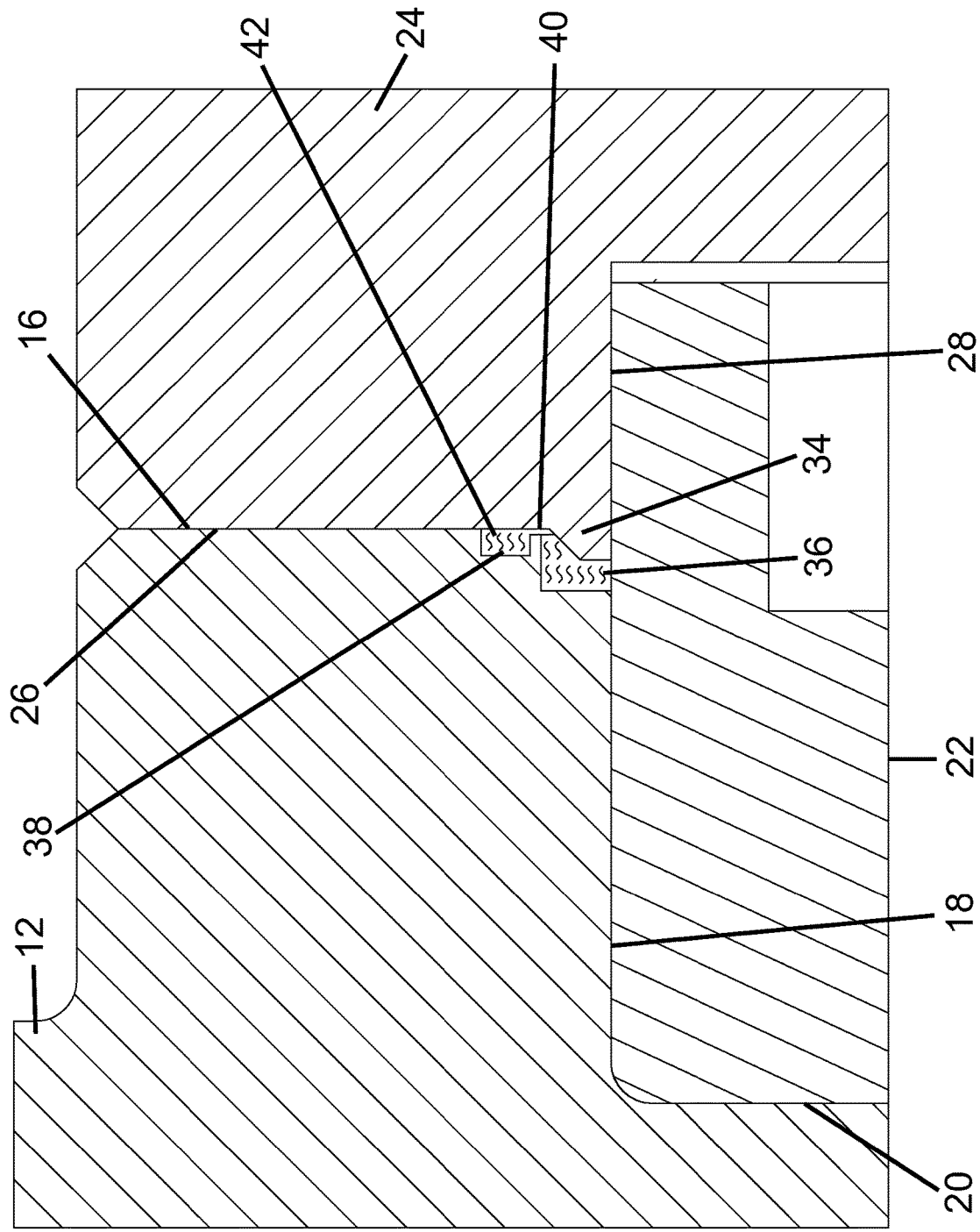

STRAIN WAVE GEAR SYSTEM

CROSS-REFERENCE TO RELATED APPLICATIONS

This is a divisional application of U.S. patent application Ser. No. 17/526,215 filed on Nov. 15, 2021, which is a divisional application of U.S. patent application Ser. No. 16/132,559, filed on Sep. 17, 2018, now U.S. Pat. No. 11,174,929, which is a divisional application of U.S. patent application Ser. No. 14/422,882, filed on Feb. 20, 2015, now U.S. Pat. No. 10,077,829, which is a US National Stage of PCT/US13/55985, filed on Aug. 21, 2013, which claims the benefit of U.S. Provisional Application No. 61/691,400 filed on Aug. 21, 2012, the entire contents of which are incorporated herein by reference.

BACKGROUND

The present invention generally relates to strain wave gear systems and in further aspects to sealing and lubricating systems useable therein as shown and described.

Strain wave gearing has been successfully used in industrial, medical, aerospace and defense fields. Generally, strain wave gearing functions by attaching an elliptical member to the system input, the elliptical member forms an external gear, known as a flexspline, in a shape such that it engages the internally toothed outer housing 180 degrees apart and having clearance between the gears 90 degrees from each engagement. As the input spins the elliptical member, the external teeth engage an internally toothed outer member commonly known as a circular spline. The externally toothed gear has less teeth than the internally toothed gear such that relative motion between the gears is created. This relative motion can be realized as a gear ratio. The end result is a speed/torque trade off that has high value in the motion control market.

A tubular shaft was added to the externally toothed gear (flexspline) to achieve many of the features of strain wave gear technology. The tubular shaft allows the strain wave gearing to be zero backlash, decreases bearing loads, and balances internal forces. It also dramatically increases the strain life of the externally toothed gear by distributing the strain over a longer distance.

Strain wave gearing has multiple uses. One use is as an integrated gear system designed in a specific machine for a specific purpose. These systems are highly engineered and customized for a particular application. Additionally, a strain wave gear set can be configured into a housing with an input and an output to be utilized by another user, typically referred to as a gearbox. These gearboxes are configured more for the general market, where an integrator would pair it up with other components to build a machine. Strain wave gearboxes come in many forms but have some things in common. First, they have an input, either a shaft, a flange, or a bore. They also contain an output in one of the same three options. Furthermore, they include a housing and some combination of bearings.

Installing the elliptical member, also called the wave generator, into the flexspline is a critical step in obtaining the proper performance of the gearset. One manner of installation is to attach the wave generator to the input and install as an assembly. There are multiple disadvantages with a system in this configuration. First, the input needs to have a custom modification to properly position the wave generator, such as a bolt and step. This custom modification can add significant costs to the system. Second, the end user is the one ultimately responsible for properly positioning a critical component of the gear system which creates risk for the end user. If the positioning can be done by the manufacturer, control of the precise position of the system is assumed by the manufacturer rather than the end user, ultimately increasing the product performance.

Another method of installation is to have the wave generator constrained, then install the input. As an example, the wave generator has been constrained by using ball bearings positioned on one or both sides of the wave generator. This constraining method allows the manufacturer to properly position the wave generator instead of the end user. By doing so, the end user just needs to connect to the system with a simple coupling device, such as a key, a bolted connection, a clamp collar, bolts or the like.

This method has a disadvantage because the ball bearings over constrains the system radially, such that any error in the manufacturing of the bearings, or the parts the bearings are attached to, will load the bearings in an undesirable manner. Each of the three bearings will have different centerlines, which is the case in any manufactured part simply due to machining tolerances. When the shaft is rotated, the eccentricities create radial loads in the bearings that are a function of the amount of eccentricity in the system.

One of the largest advantages of strain wave gearing is its size compared to other gearings systems, such as planetary gears. Strain wave gears are significantly smaller in size as that of other gearing systems with similar ratios. Reduction in the size of a strain wave gearbox further increases the value of that product.

The input connection is a feature that can be improved on to reduce the length of the gearbox, therefore adding performance. The input connection can be done in many ways including, a keyed connection, a friction lock, a taper lock, fastener connection or the like. In conjunction with the connection, there is usually a compliance device used to compensate for misalignments between the rotational axis of the input and the rotational axis of the wave generator. In some cases, no compliance device was provided for the bearing on the wave generator, but this method of connection risks damaging the wave generator bearing due to eccentric loading. The typical compliance connection used in strain wave gearing is an Oldham style coupling. An Oldham coupling uses two 90 degree opposed drive lugs to transmit torque. Those drive lugs are connected via a floating member, thus allowing for compensation of axial misalignment. The disadvantage is that the Oldham style coupling adds length and backlash to the system. The backlash comes from the need to allow room for the drive lugs to slide radially to compensate for parallel misalignment. The length is simply due to the fact that the Oldham style coupling is positioned axially next to the wave generator.

These systems also require lubrication and, thus, need to be sealed. In order to provide sealing, typical designs use methods such as O-rings, gaskets, or joint sealant. Each of these methods has a disadvantage. Specifically, O-rings require significant space, resulting in a larger product; gaskets add length to the system and create a flexible member between two joints, which decreases the overall system stiffness; and a joint sealant is difficult to apply in a consistent amount over the full connection, creating a flexible member between joints, risking not having sealant at portions of connection, and allowing for leakage.

Various types of bearings can be used to support the output. Most bearings, such as cross roller bearings, need to be lubricated before use, and periodically over the product life. The cross roller bearing has provisions located on the outer race in the form of radial holes to be used for re-greasing. Typically, re-greasing is done by the end user by applying a grease gun to a fitting installed by the gearbox manufacturer. However, customers do not like to use grease as it is messy and can contaminate surrounding items; it is difficult to ensure the proper amount of grease was added; and it can be difficult to get to re-greasing points.

Thus, a need exists for methods and systems which overcome the deficiencies of the prior art.

SUMMARY

This need and other problems in the field of motion control are solved by providing a strain wave gear system including a ring gear, a wave generator rotatable with an input, and a flexspline of a non-circular shape and rotatable with an output and in gearing engagement with the ring gear by the wave generator. A first bearing is located intermediate a first race of the output and a first face of a radially extending disc of the input, and a second bearing is located intermediate a second race of the output and a second face of the radially extending disc of the input. In a form shown, the input further includes strain relief.

In a further aspect, a sealing system includes a housing and a cap each including first axial ends which abut with each other and including axially extending inner surfaces at the same radial distance. An element, such as the ring gear in the case of a strain wave generator, is received in and abuts with the axially extending inner surfaces. On one of the cap and the housing, a protrusion is formed on the first axial end adjacent the axially extending inner surface. On the other of the cap and the housing, a cavity having a volume greater than the protrusion is formed on the first axial end adjacent the axially extending inner surface. During assembly, the protrusion extending into the cavity forces sealant from the cavity through a communication channel into a relief volume formed in the first axial end.

In still a further aspect, a lubricating system for a bearing provided between a housing and a mount includes a plunger slideably received in a bore in a controlled manner, with the bore extending from the periphery of the housing to the bearing. Grease in the bore is forced from the bore into the bearing when the plunger is slid into the bore.

Illustrative embodiments will become clearer in light of the following detailed description in connection with the drawings.

DESCRIPTION OF THE DRAWINGS

The illustrative embodiments may best be described by reference to the accompanying drawings where:

FIG. 5 shows a partial, enlarged, cross sectional view of the strain wave gear system of FIG. 1.

Figure 1:
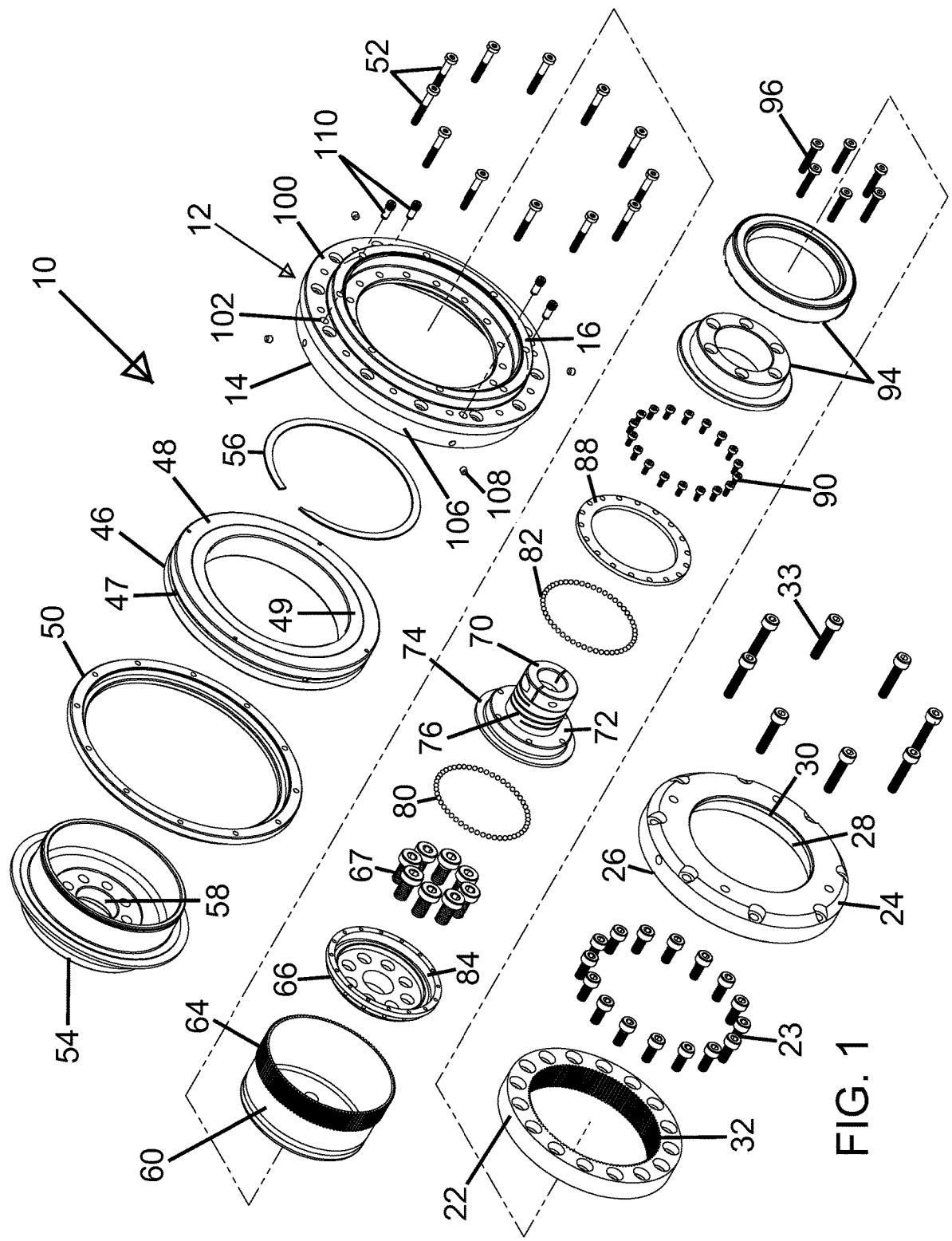
FIG. 1 shows an exploded perspective view of a strain wave gear system.
Figure 2:
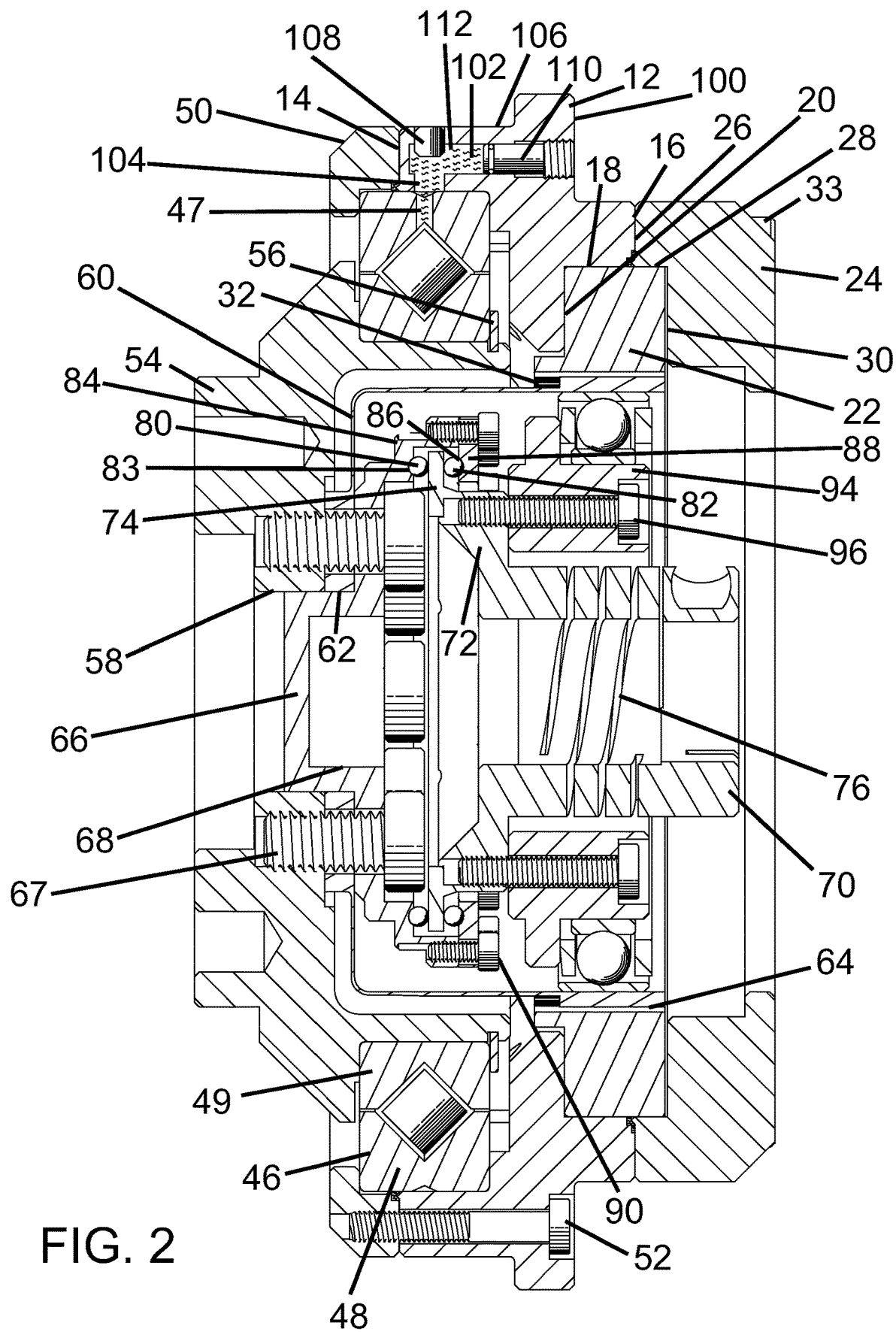
FIG. 2 shows a cross sectional view of the strain wave gear system of FIG. 1.
Figure 3:
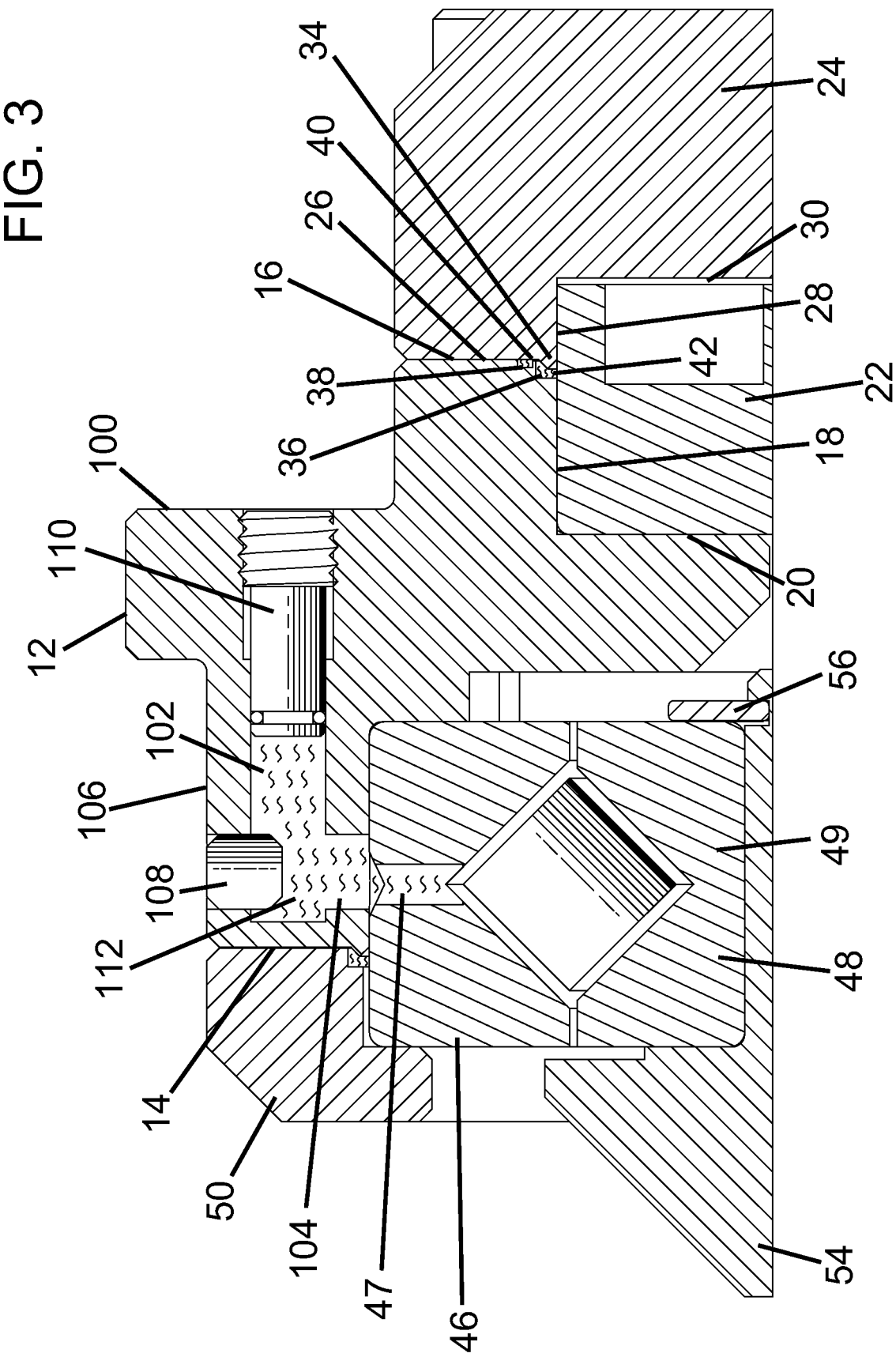
FIG. 3 shows a partial, enlarged, cross sectional view of the strain wave gear system of FIG. 1.
Figure 4:
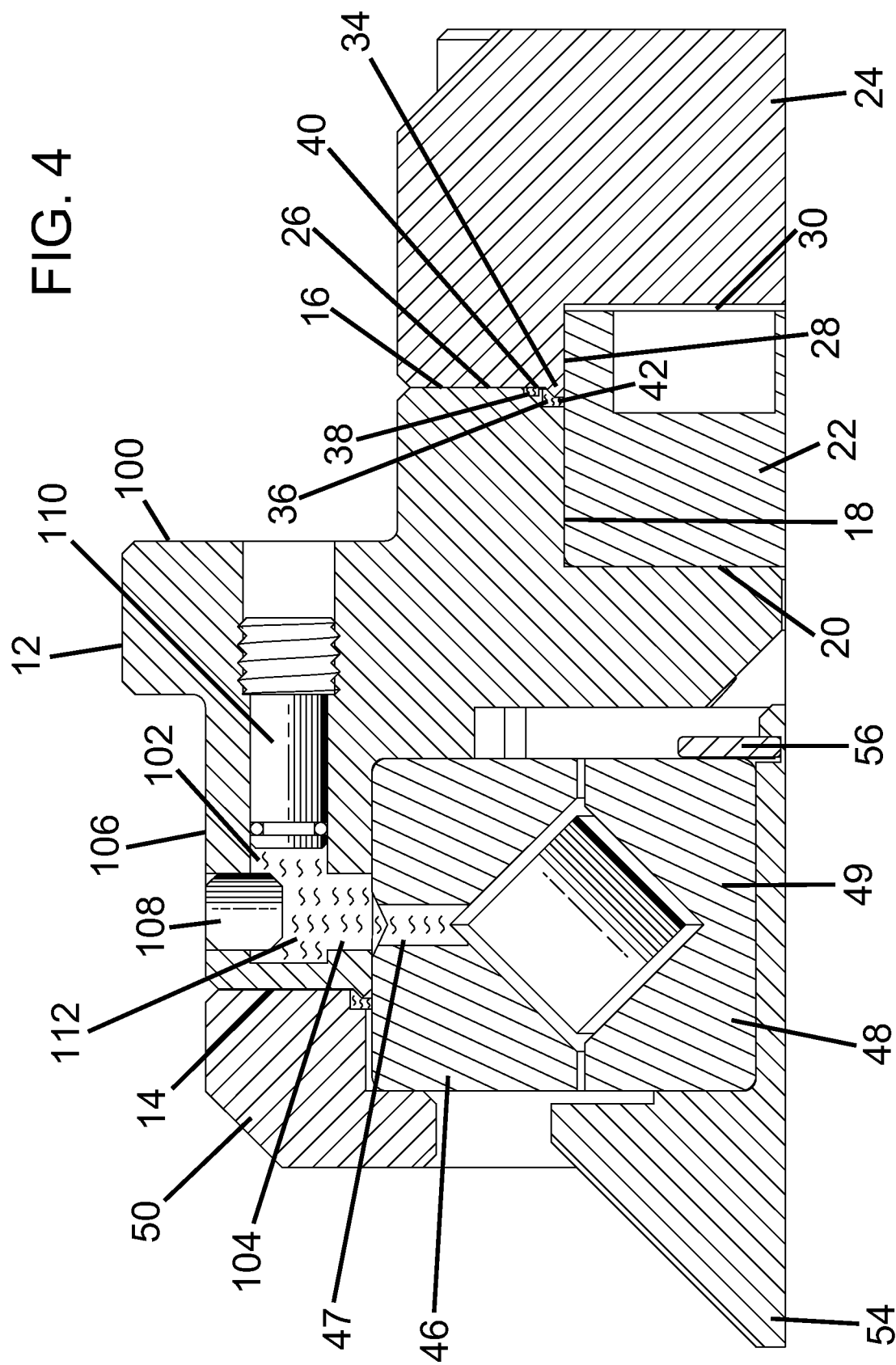
FIG. 4 shows a partial, enlarged, cross sectional view of the strain wave gear system of FIG. 1.

All figures are drawn for ease of explanation of the basic teachings only; the extensions of the figures with respect to number, position, relationship, and dimensions of the parts to form the illustrative embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION

A strain wave gear system is shown in the drawings and generally designated 10. Gear system 10 generally includes a housing 12 of a generally cylindrical shape and having a first axial end 14 and a second axial end 16. An axially extending inner surface 18 extends axially inward from end 16 and terminates in a radially extending surface 20 to define a pilot. A ring gear 22 is located in the pilot of housing 12 and is secured thereto such as by bolts 23 extending through ring gear 22 and threaded into housing 12 and by an annular bearing cap 24 having an axial end 26 abutting with end 16. Cap 24 is also known as a motor adapter as it serves two purposes. Cap 24 includes an axially extending inner surface 28 extending axially inward from end 26 generally at the same radial extent or distance as surface 18. Surface 28 terminates in a radially extending surface 30, with surfaces 28 and 30 defining a pilot for ring gear 22. Cap 24 is suitably secured to housing 12 such as by bolts 33 as shown. Ring gear 22 includes a plurality of inner spline teeth 32.

A protrusion 34 is formed on end 26 adjacent to the interconnection of end 26 and surface 28. In the form shown, protrusion 34 has cross sections of a quadrilateral shape having a base on end 26, a top extending parallel to the base but of a shorter length, a first end extending perpendicular between the top and the base and generally coextensive with surface 28 and a second end extending generally 45° between the base and the top, but other shapes and locations may be possible. A cavity 36 is formed at the interconnection of end 16 and surface 18 and of a volume larger than and for receiving protrusion 34 and of a depth greater than the length of the first end and of a height greater than the length of the base of protrusion 34. In the form shown, cavity 36 has cross sections of a right quadrilateral, but other shapes may be possible. A relief volume 38 is formed in end 16 spaced from surface 18 and cavity 36. In the form shown, volume 38 has cross sections of a right quadrilateral, but other shapes may be possible. A communication channel 40 is formed in end 16 and interconnects cavity 36 and volume 38, with the depth of channel in end 16 being less that that of cavity 36 and volume 38.

In one manner of assembly, ring gear 22 is placed in the pilot defined in housing 12, and sealant 42 is filled in cavity 36 generally up to channel 40. Cap 24 is then piloted upon ring gear 22 until end 26 abuts with end 16 so that ring gear 22 abuts with and overlaps surfaces 18 and 28. In doing so, protrusion 34 enters cavity 36 and displaces sealant 42 to flow through channel 40 into volume 38. The size of volume 38 must be larger than the size of protrusion 34 to receive all sealant 42 in cavity 36 displaced by protrusion 34 to ensure that sealant 42 does not enter between ends 16 and 26. Thus, positive connection of sealant 42 and housing 12, ring gear 22, and motor adaptor 24 is ensured as well as to ensure that sealant 42 will not enter between abutting ends 16 and 26 of housing 12 and cap 24.

An outer race 46 of a bearing 48 is sandwiched between an annular bearing cap 50 and housing 12, with bearing cap 50 suitably secured to housing 12 such as by bolts 52. The inner race 49 of a bearing 48 is fixed to an annular mount or output 54 such as being restrained by a retaining ring 56 in a pilot formed in output 54. Output 54 includes a center axial bore 58.

A flexspline 60 is of a generally cup shape and includes a center axial bore 62 of a size and shape corresponding to bore 58. Flexspline 60 further includes radially outwardly directed teeth 64 in a gearing relation with teeth 32 of ring gear 22.

Flexspline 60 is rotatably fixed to output 54 by being sandwiched thereagainst by a retainer 66 suitably fixed thereto such as by bolts 67. In the form shown, radial alignment is obtained by a spindle 68 of retainer 66 being slideably received in bores 58 and 62 of output 54 and flexspline 60.

Strain wave gear system 10 further includes an input in the form of a hub or coupling 70 and a collet or a radially extending flange 72 extending from coupling 70 and terminating in a radially oriented flat disc 74. In the form shown, coupling 70 includes a strain relief 76 shown as a slot removing material from coupling 70 and in a helical shape. It should be appreciated that other manners of removing material from coupling 70 can be utilized to allow coupling 70 to strain to compensate for parallel and angular misalignment without sacrificing backlash.

To axially constrain coupling 70 relative to output 54, flexspline 60 and retainer 66 but not radially, first and second sets of ball bearings 80 and 82 are located on opposite axial faces or sides of flat disc 74. The first set of ball bearings 80 are contained by an annular groove 83 formed in a radially extending flange 84 of retainer 66. Thus, the first set of ball bearings 80 are located intermediate the first face of flat disc 74 and a first race formed by radially extending flange 84. The second set of ball bearings 82 are contained by an annular groove 86 formed in an annular retainer plate 88 fixed to flange 84 of retainer 66 radially outward of flat disc 74 such as by bolts 90. Thus, the second set of ball bearings 82 are located intermediate the second face of flat disc 74 and a second race formed by annular retainer plate 88 axially spaced from the first race. Containing ball bearings 80 and 82 in grooves 83 and 86 ensure that the balls of ball bearings 80 and 82 do not move radially or axially during operation, only rotational motion is observed. Although shown as ball bearings 80 and 82, solid lube bearings such as bronze or PTFE can be used which may have a further advantage as the material will wear away during operation leaving ZERO drag torque driving operation.

Strain wave gear system 10 also includes a wave generator 94 generally concentric to coupling 70 and shown secured to flange 72 such as by bolts 96. Wave generator 94 is non-circular or generally oval-shaped having at least two diametrically opposed lobes along its outer periphery, radially outward of coupling 70 and radially inwardly of teeth 32 and 64. It should be appreciated that strain relief 76 is located radially within and concentric to teeth 32 and 64 and wave generator 94 in order to achieve compliance but without adding length or backlash to-strain wave gear system 10. Particularly, wave generator 94 is connected to flange 72, and coupling 70 including strain relief 76 is wrapped back under wave generator 94.

Housing 12 includes a radially extending step 100 located radially outwardly of bearing 48 and axially intermediate ends 14 and 16. A plurality of axial bores 102 extends from step 100 towards but spaced from end 14 circumferentially spaced from each other and radially outwardly of bearing 48. A plurality of radial bores 104 extends from the outer periphery 106 and intersects with the plurality of axial bores 102 and aligned with access to the plurality of radial holes 47 formed in outer race 46 of bearing 48. Each of the plurality of radial bores 104 is closed by a plug 108 adjacent outer periphery 106 and suitably secured therein such as by press fitting. Each of the plurality of axial bores 102 includes a plunger 110 adjacent step 100 slidably received therein in a controlled manner such as being threaded therein.

During assembly, grease 112 is filled in the plurality of bores 102 and 104 with each plunger 110 in its outermost position in its stroke. After installation and use of strain wave gear system 10 and when a re-greasing interval is met, the end user simply moves one of the plurality of plungers 110 inward such as by rotating it with a tool in the form shown until it has bottomed out its stroke. Thus, grease 112 is forced from the corresponding bores 102 and 104 into radial hole 47, with the amount of grease 112 in bores 102 and 104 being the precise amount of grease recommended by the manufacturer of bearing 48. Thus, bearing 48 can be re-greased equal to the number of plurality of plungers 110 included in strain wave gear system 10, with the number of plungers 110 provided can be sufficient to provide re-greasing for the service life of bearing 48.

Now that the basic teachings have been explained, many extensions and variations will be obvious to one having ordinary skill in the art. For example, although strain wave gear system 10 of the form shown includes the combination of several, unique features and systems believed to obtain synergistic results, systems could be constructed including such features singly or in other combinations.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A sealing system of a strain wave gearing system, the sealing system comprising:
   a sealant;
   a ring gear;
   a housing having a first axial end and an inner surface extending axially from the first axial end;
   a cap having a first axial end and an annular inner surface extending axially from the first axial end of the cap, the first axial end of the cap abutting the first axial end of the housing, and the ring gear abutting with and overlapping the annular inner surface of the cap; surfaces;
   a protrusion formed on the cap between the first axial end of the cap and the annular inner surface of the cap;
   a cavity formed between the first axial end of the housing and the inner surface of the housing, the cavity, being larger than the protrusion;
   a relief volume formed in the first axial end of the housing, wherein the relief volume is spaced from the inner surface of the housing and from the cavity; and a communication channel connecting the cavity to the relief volume thereby allowing the sealant to be filled in the cavity and to be displaced into the relief volume-through the communication channel when the protrusion enters the cavity.

2. The sealing system of claim 1, wherein the protrusion has cross sections of a quadrilateral shape having a base on the first axial end of the cap, a top extending parallel to the base but of a shorter length, a first end extending perpendicularly between the top and the base and generally coextensive with the annular inner surface of the cap, and the housing, and a second end extending between the top and the base.

3. The sealing system of claim 1, wherein the cavity and the relief volume each have cross sections of a right quadrilateral, and wherein the communication channel is formed in the first axial end of the one of the housing and the cap.

* * * * *